United States Patent

Cross

[11] Patent Number: 5,704,278
[45] Date of Patent: Jan. 6, 1998

[54] ENERGY EFFICIENT HIGH CAPACITY ROTARY OVEN

[76] Inventor: Gloria Cross, 10170 Green Hills Dr., Portland, N.Y. 14769

[21] Appl. No.: 767,187

[22] Filed: Dec. 16, 1996

Related U.S. Application Data

[60] Provisional application No. 60/009,323, Aug. 26, 1996.

[51] Int. Cl.$^6$ .................. A47J 27/00; A47J 37/00; A47J 37/04; A47J 43/18
[52] U.S. Cl. .................. 99/427; 99/443 R; 99/448; 99/450; 99/482; 126/25 R; 126/21 A
[58] Field of Search .................. 99/386, 426, 427, 99/444–446, 447, 448, 450, 443 R, 443 C, 337, 421 P, 402; 126/21 A, 25 R, 25 AA, 26

[56] References Cited

U.S. PATENT DOCUMENTS

| | | | |
|---|---|---|---|
| 3,835,760 | 9/1974 | Rekesius | 99/386 X |
| 3,901,136 | 8/1975 | Wilson et al. | 99/421 P |
| 4,184,420 | 1/1980 | Podaras et al. | 99/427 |
| 4,300,523 | 11/1981 | Robertson et al. | 126/21 A |
| 4,470,343 | 9/1984 | Didier | 126/25 R |
| 4,548,130 | 10/1985 | Diener et al. | 99/448 X |
| 4,723,482 | 2/1988 | Weiss et al. | 99/443 R |
| 4,984,557 | 1/1991 | Konig | 126/21 A |
| 5,158,066 | 10/1992 | Dodgen | 126/25 R |
| 5,322,007 | 6/1994 | Caridis et al. | 99/476 |
| 5,361,686 | 11/1994 | Koopman | 99/446 X |
| 5,377,582 | 1/1995 | Nersesian | 99/448 X |
| 5,431,093 | 7/1995 | Dodgen | 99/448 X |

*Primary Examiner*—Timothy F. Simone
*Attorney, Agent, or Firm*—Michael I. Kroll

[57] ABSTRACT

An energy efficient high capacity rotary oven (10) comprising a main oven body enclosure (12) having an exhaust pipe (14). A shelf assembly (16) is mounted in a rotatable manner within the main oven body enclosure (12) between lateral side walls thereof, whereby the shelf assembly (16) will hold various foods to be cooked. A driver mechanism (18) is mounted on the main oven body enclosure (12) for rotating the shelf assembly (16). A gas burner system (20) is within the main oven body enclosure (12) below the shelf assembly (16). A cooking access system (22) is on the main oven body enclosure (12) in front of the shelf assembly (16), so that a person can open the cooking access system (22) to safely reach the food on the shelf assembly (16). A forced air circulation system (24) is on the main oven body enclosure (12).

21 Claims, 7 Drawing Sheets

ENERGY EFFICIENT HIGH CAPACITY ROTARY OVEN

This application claims the benefit of U.S. Provisional Application 60/009,323, filed Aug. 26, 1996.

BACKGROUND OF THE INVENTION

1. Field of the Invention

The instant invention relates generally to baking ovens and more specifically it relates to an energy efficient high capacity rotary oven.

2. Description of the Prior Art

Within the food preparation industry there has evolved specialized baking ovens, such as conveyor ovens, where the food like pizzas goes in one end and arrives at the other end cooked; pancake ovens, which you will find in just about all pizza stores; rotary ovens, whose basic design has not changed in the last twenty five years and the standard baking ovens, from the size found in most households to walk in baking ovens. The limitations of the conveyor and pancake ovens is fully realized, when businesses using these ovens want to expand their offerings of different food products.

Further drawbacks to pancake ovens are in their operation and capacity. They are designed to be continuously operated. This would be fine if there was a continuous flow of customers, but customer activity is based on time of day, day of the week, seasons and weather, and with a mean start-up time of thirty to forty five minutes, you cannot turn them off. This is a very inefficient use of energy. Another shortcoming is that the ovens are not easy to use. The door, hinged at the bottom, opens out requiring the food products to be moved out onto the door for viewing and manipulation, like constantly rotating a pizza while it is cooking, which is probably due to hot spots in these ovens.

Conveyor ovens, which require little judgement on the part of the user, who is usually a minimum wage worker hired solely to feed the oven, overcomes the capacity limitations of the pancake ovens when cooking pizzas, but sacrifices the individual attention, which is often necessary, base on differing thicknesses of crust and the number of toppings placed on the pizza. These ovens may well serve those selling the pizzas, but anyone who get the under cooked or burned pizza doesn't appreciate that most of the pizzas turn out all right. Another shortcoming of conveyor ovens, is their inability to handle a number of food types at the time.

Another drawback to all of these ovens, is the exposure to intense heat every time you open the door. It is an undesirable aspect of food preparation that the high temperatures necessary to eliminate or neutralize certain bacteria, especially those associated with meat and meat by products, are a hazard to the human operators of these ovens. Considering the fact that these same operators will minimize their contact with the oven until absolutely necessary, often results in under and overcooked foods such as pies, chickens, and pizzas to name a few.

The rotary ovens that are presently available have several weaknesses in their design. The support members for the shelves are thin rectangular shaped bars radiating from the main axle and have numerous cross members attached for structural integrity and for maintaining the horizontal position of the shelves.

Therefore, the amount of cooking shelf space becomes a variable of the material and thickness of the arms. Also, the inevitable metal fatigue in such a design increases the maintenance costs of the oven. It should also be noted, that the present arm system and rigid support members keeping the shelves in a horizontal position, does not allow for any movement of the individual shelves. Anything, like fingers, caught between the edge of the door opening and the shelves would be severely damaged. Another weakness is the door, which opens out to the operator and impedes the operator's access to the shelves.

Numerous baking ovens have been provided in prior art. For example, U.S. Pat. Nos. 3,901,136 to Wilson et al.; 4,984,557 to Konig; 5,361,686 to Koopman and 5,377,582 to Nersesian all are illustrative of such prior art. While these units may be suitable for the particular purpose to which they address, they would not be as suitable for the purposes of the present invention as heretofore described.

WILSON, ROBERT GARY—ROGERS, RAYMOND W.—WILLIEN, ANTHONY GEORGE

DISPLAY OVEN

U.S. Pat. No. 3,901,136

A display oven for cooking edibles on spits, skewers and the like is illustrated having a glass extension, projecting forwardly of an insulated housing. Carried partially therein is a rotatable edible carrier assembly, having a telescoping central shaft permitting ready removal of the edible carrier assembly. A flavoring means that includes a metallic housing, having a rear wall is suspended in heat transfer relation from a heating element carried within the housing. A downwardly and inwardly inclined resilient means presses a hickory chip and the like against the rear wall, causing the hickory chip to smoke for flavoring the edibles within the oven.

KONIG, HELMUT

BAKING OVEN

U.S. Pat. No. 4,984,557

The invention refers to a baking oven having a baking chamber which is accessible via a door and which is designed for introducing therein a carriage carrying baking goods, so that the carriage is stationary during a baking process. The baking oven comprises two air channels extending laterally of the baking chamber at both sides thereof over the effective height of the baking chamber and being each separated from the baking chamber by a partition provided with a plurality of air passage openings. The air channels are, during the baking process, alternately supplied by a blower and, via a switching equipment, with hot air heated by a heating means. The hot air is humidified by a vapor supply means and transversely passes the baking chamber in alternating directions and is subsequently again sucked back along a closed circuit to the suction side of the blower. The blower and heating means are arranged at a higher level than the baking chamber and at least partially above the baking chamber.

KOOPMAN, PETER J.

ROTISSERIE OVEN

U.S. Pat. No. 5,361,686

A rotisserie oven includes an air plenum having three sections surrounding a cooking chamber. Two sections extend along opposing lateral walls while a third section extends along the top wall of the cooking chamber. Exhaust vents in the air plenum provided forced, heated air into the cooking chamber from three sides. The inlet and exhaust vents have hooded louvers to reduce the amount of grease entering the air plenum. A grease collection device includes a drawer having two handles for easier manipulation thereof. A control system, disposed at the bottom of the oven near the grease drawer, is isolated from the relatively hot cooking chamber by a stream of cool ambient air. A temperature sensor is disposed on the suction chamber side of a blower and near the oven door, so that changes in the cooking chamber temperature are rapidly sensed.

NERSESIAN, JOHN

COOKING OVEN AND METHOD

U.S. Pat. No. 5,377,582

A cooking oven and method of cooking vertically arrayed food carrying skewers movably attached and carried in a horizontal endless travel path by conveyor means to encircle a heating element array within a single open cooking oven chamber, so as to constantly directly and indirectly expose the food to the heat radiated from the element array throughout the complete travel path within the oven chamber. A plurality of internested drip pans are disposed within the oven chamber vertically beneath the food travel path for collecting juice drippage. The oven chamber superposed beneath a conveyor chamber contains an alternating array of infrared gas burners and reflectors arrange upright in a row. A slot communicating between the conveyor chamber and oven chamber provides for travel of suspended food carrying skewers within the oven chamber and incorporates a gasket seal to retain heat and inhibit transfer of contaminants downwardly to the oven chamber. Each skewer provides a stripper disk, for facilitating unloading of food products and a retention clip for retaining food products vertically arrayed on each skewer. The oven has loading and unloading station doors at opposite sides and access doors at its ends, to facilitate cooking and cleaning. The method of cooking shish kebobs or food carrying skewers allows for arranging food products selectively in a vertical array, to obtain desired juice drippage between suspended food products, to achieve a desired predetermined basting and seasoning therebetween.

SUMMARY OF THE INVENTION

A first object of the present invention is to provide an energy efficient high capacity rotary oven, that will overcome the shortcomings of the prior art devices.

A second object is to provide an energy efficient high capacity rotary oven, having a simple, user friendly interface, by placing all power controls next to the door in an open faced recessed compartment. This control panel is comprised of three toggle switches. The topmost switch is the main power switch for the oven. The second toggle switch turns on the blower and provides power for the burner. The third switch controls the rotation of the shelves, forward, stop, and reverse. The temperature selector dial is located on the other side of the door along with an indicator light for the main power on condition. Additionally, there is an emergency stop button located just below the door to one side. In the event of an emergency, one need only press against this button to shut off the burner and stop the rotation of the shelves.

A third object is to provide an energy efficient high capacity rotary oven that will significantly reduce the transfer of heat from the interior cooking chamber to the exterior skin. To minimize conduction heat loss, which occurs from contact between the internal surfaces and the external surfaces, the interior cooking chamber has been isolated from the exterior surfaces and encased in a high density insulation, known as KFAC-19, rated at 2600 degrees Fahrenheit. The duct work used in the forced air circulation system and venting of the oven overcomes this conduction problem, by terminating the interior duct work before it comes into contact with the exterior skin and by having the exterior duct work 3/32 inch larger on the radius than the interior duct work.

A fourth object is to provide an energy efficient high capacity rotary oven with a modular design for the placement of the driver mechanism for the shelves, the electrical access panel and the fuel connection. The left and right interior and exterior panels of the present invention are mirror images of each other and these connections can be changed at any time, even after years of service.

A fifth object is to provide an energy efficient high capacity rotary oven that will reduce the food preparation time by cooking, using a forced hot air system. The present invention is equipped with a 400,000 BTU gas fired burner and a blower moving 1000 cubic feet of air a minute. With the introduction of convection style cooking, drastic reductions in food preparation time have been achieved. A pizza in a commercial pizza oven takes eight and a half minutes to cook, in the present invention the cooking time if five and a half minutes. This is a thirty six percent reduction in cooking time. Of course, the time savings will vary according to the type of food being prepared, but similar savings have been achieved with pies and chickens.

A sixth object is to provide an energy efficient high capacity rotary oven with the capability of baking a large number of any one food product, such as, forty eight turkeys or one hundred twenty five chickens. To handle the extreme weight, the present invention attaches six two shelf members to the periphery vertices of two reinforced hex shaped plates. Each of the six shelf members are attached to a counterbalance ring, which maintains each member in a horizontal position through its own shelf axis. This configuration allows for heavier loads and larger shelves, because the shelves hang from the reinforced hex plates instead of being supported at the end of an arm. The present invention has twelve shelves each measuring eighteen inches by thirty six inches, yielding fifty four square feet of cooking shelf space. The simpler design, also reduces the maintenance costs of the present invention over the existing mechanical arm system available in rotary ovens. Another advantage to the individual shelf axis system, is the built in play of a few degrees of rotation, which allows for movement of the individual shelf members in case objects, such as fingers, get in the way.

A seventh object is to provide an energy efficient high capacity rotary oven having a convenient viewing port by installing a door with thermally insulated glass and by illuminating the interior with two forty watt bulbs positioned on each side of the door opening and mounted to the interior ceiling.

An eighth object is to provide an energy efficient high capacity rotary oven with a door, which will not hinder the user while open and maintain a thermal barrier when closed. The door is placed between vertical tracks and with the aid of counterweights is raised out of position providing full close access to the shelves. The tracks are inclined toward the cooking chamber at the bottom, so as to maintain a good thermal barrier when the door is lowered to its closed position.

A ninth object is to provide an energy efficient high capacity rotary oven, that will eliminate the need for a grease trap. Because of the high operating temperatures and the forced air system, grease dissipates into the air and in combination with the venting of large quantities of this same air, these is no need for a grease trap which makes the oven relatively self cleaning.

A tenth object is to provide an energy efficient high capacity rotary oven, which will minimize the heat loss from the constant flow of food in and out of the oven through the door. The intake to the blower is placed directly over the door. This creates a fast moving curtain of air rising immediately in front of the door. The air current also has the pleasing effect that the user is not blasted with a wall of superheated air, which occurs on most ovens, every time the door is opened.

An eleventh object is to provide an energy efficient high capacity rotary oven, having a quick start. The aforementioned burner and blower enables the oven, from a cold start, to reach an operating temperature of five hundred fifty degrees Fahrenheit in under eight minutes.

A twelfth object is to provide an energy efficient high capacity rotary oven, that has significant fuel savings. The key to the efficient use of energy in the present invention is the isolated cooking chamber with the high degree of heat retention and the massive acceleration of superheated air within this chamber. To facilitate in the use of the circulation, the shelves have been designed to allow the movement of air through the shelves. The oven uses approximately ninety cubic feet of natural gas or one gallon of propane per one hour of continuous operation at five hundred fifty degrees Fahrenheit. Of course, the amount of fuel is a direct variable as to the amount of time the door is open. It should also be noted that, in most commercial applications, such as bakeries, pizza stores, and restaurants, that activity is based on many unpredictable variables. With the quick start-up capability, the present invention can be turned on only when needed, which is a novel feature for an oven this size. The fuel savings in this area alone will be significant.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 7 illustrate an energy efficient high capacity rotary oven 10, comprising a main oven body enclosure 12 having an exhaust pipe 14. The exhaust pipe 14 contains the necessary duct work, damper, and filters which are regulated by local codes and do not comprise any portion of the present invention and are not shown in any detail. A shelf assembly 16 is mounted in a rotatable manner within the main oven body enclosure 12 between lateral side walls thereof, whereby the shelf assembly 16 will hold various foods to be cooked. A driver mechanism 18 is mounted on the main oven body enclosure 12, for rotating the shelf assembly 16. A gas burner system 20 is within the main oven body enclosure 12 below the shelf assembly 16. A cooking access system 22 is on the main oven body enclosure 12 in front of the shelf assembly 16, so that a person can open the cooking access system 22, to safely reach the food on the shelf assembly 16. A forced air circulation system 24 is on the main oven body enclosure 12.

The main oven body enclosure 12, as shown in FIGS. 1 through 6, includes a plurality of interior stainless steel panels 26. A plurality of exterior stainless steel panels 28 are also provided. KFAC insulation 30 is encased between the interior stainless steel panels 26 and the exterior stainless steel panels 28, to form an external hull 32 having an isolated cooking chamber 34 therein.

The shelf assembly 16, as shown in FIGS. 3, 4, 5 and 7, consists of a main axle 36 horizontally mounted between the lateral side walls of the main oven body enclosure 12. A pair of reinforced hex shaped plates 38 are provided. Each hex plate 38 is attached centrally near one end of the main axle 36 adjacent one side wall of the main oven body enclosure 12. A counterbalance ring 40 is affixed to one hex plate 38. Six two shelf members 42 are pivotally mounted to the hex plates 18. Each two shelf member 42 will always hang down during rotation thereof and support food to be cooked.

Figure 1:
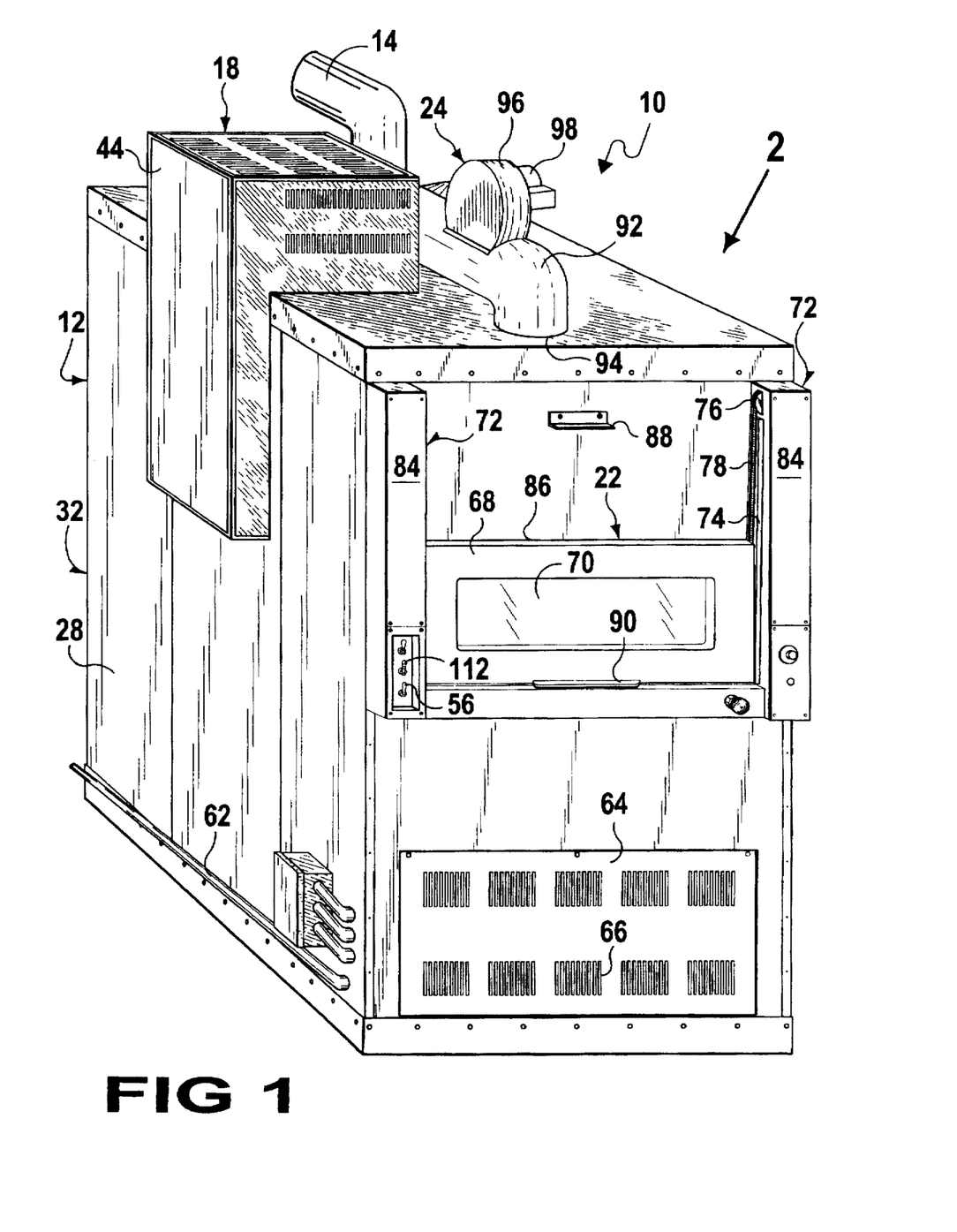
FIG. 1 is a front perspective view of the instant invention.
Figure 2:
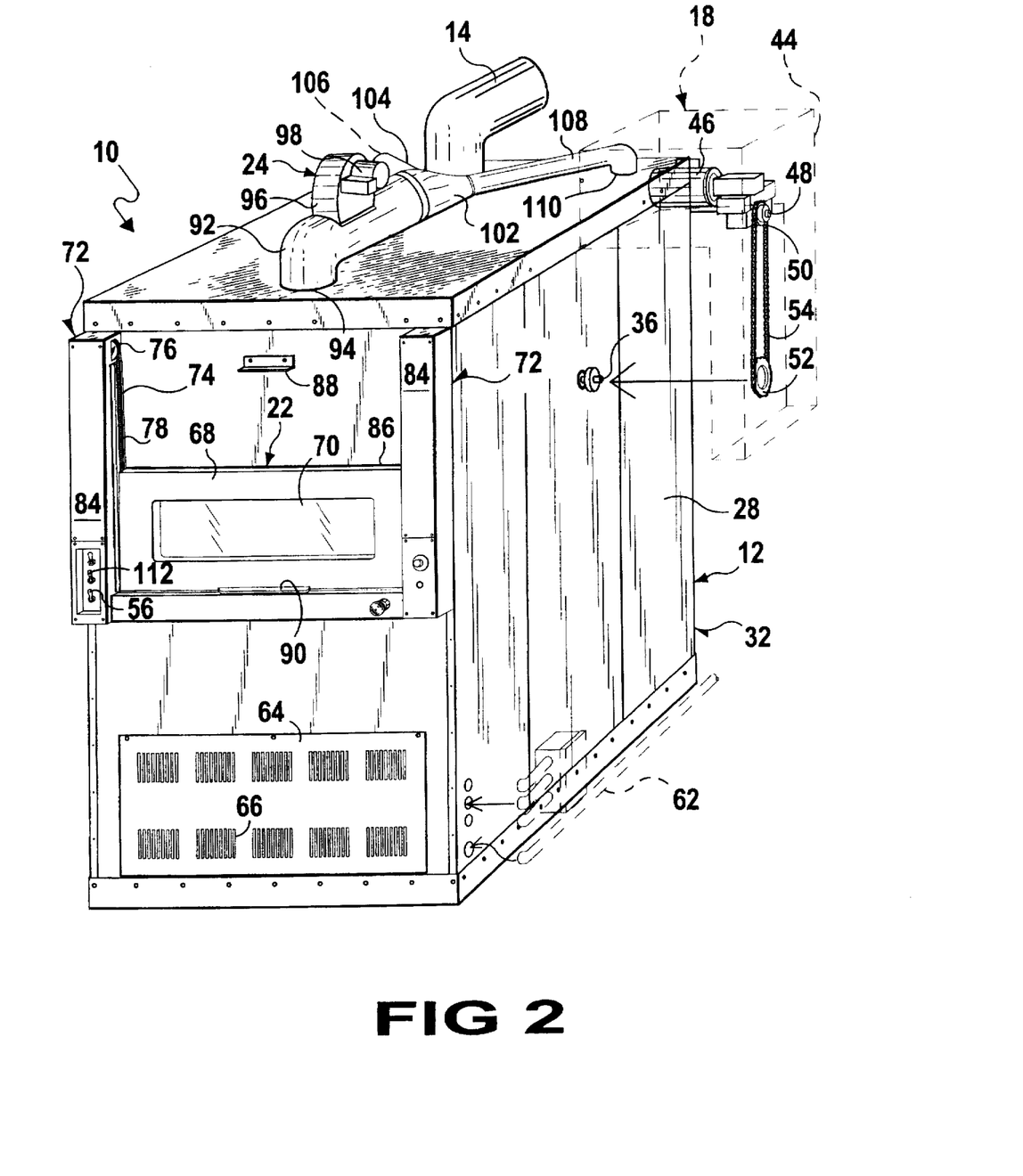
FIG. 2 is a front perspective view taken in the direction of arrow 2 in FIG. 1, showing in phantom an alternate location of the driver mechanism, electrical access panel and the fuel connection.
Figure 3:
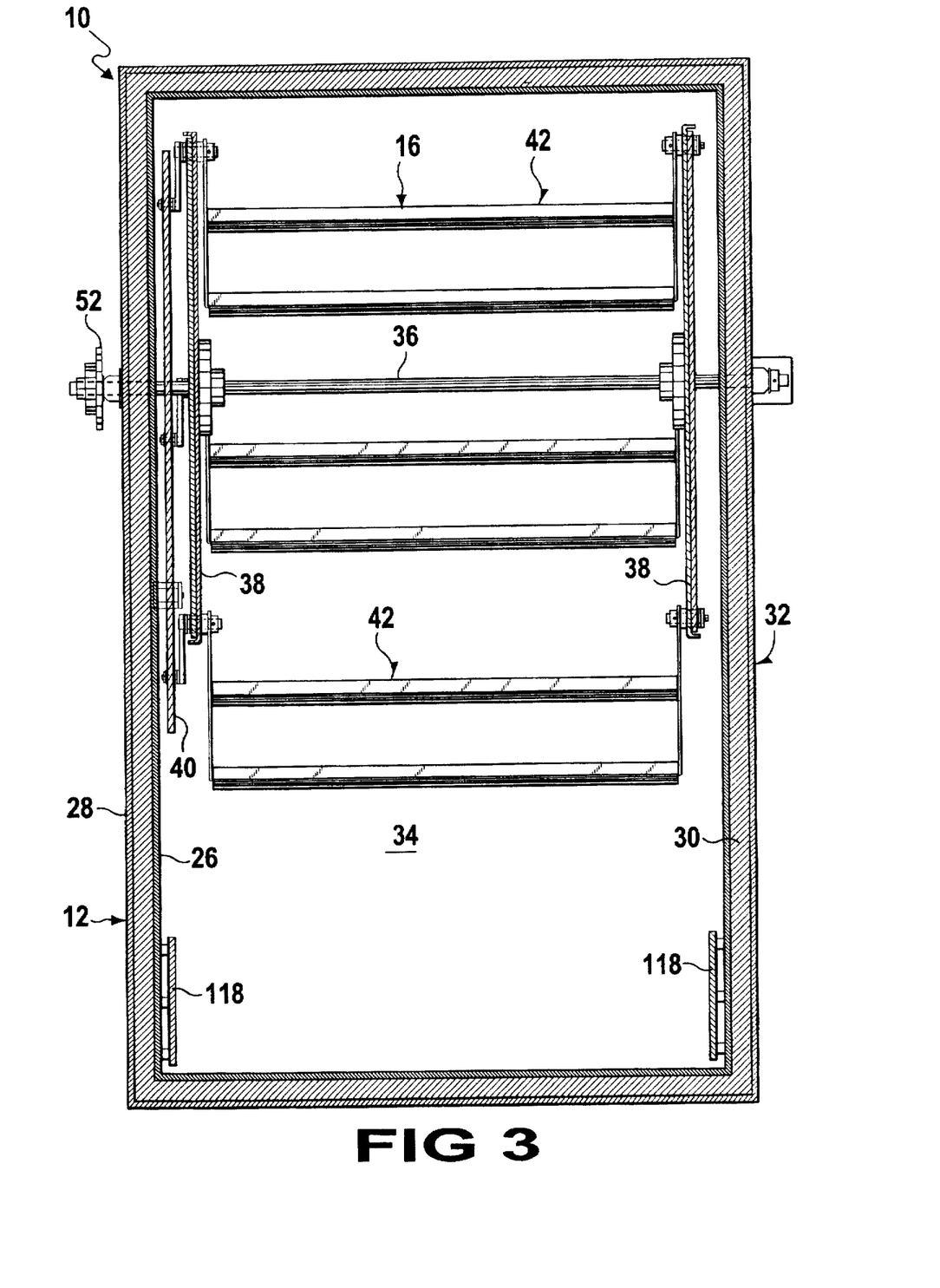
FIG. 3 is a cross sectional view taken along the lines 3—3 in FIG. 2 with parts removed, showing the shelf assembly therein.
Figure 5:
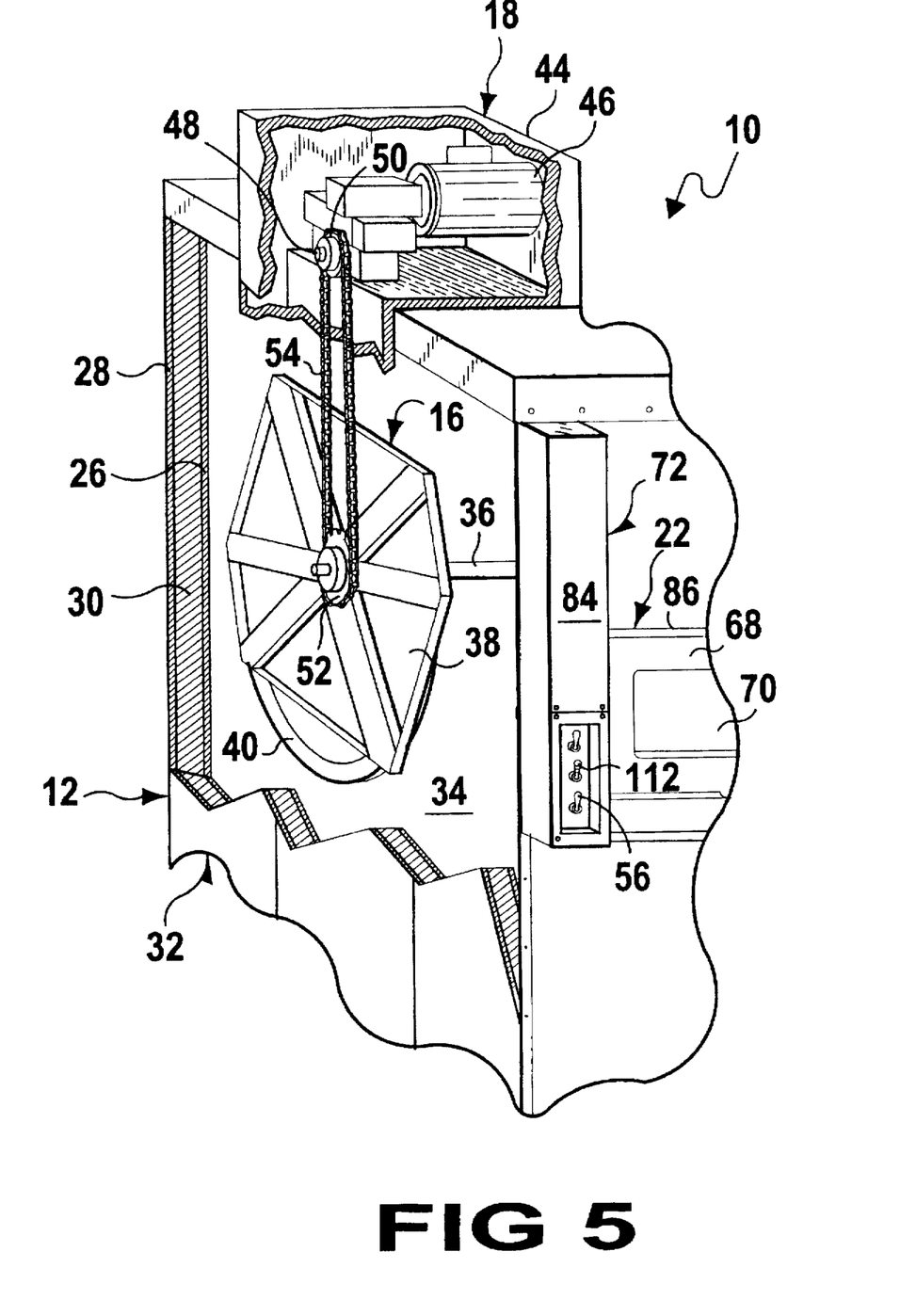
FIG. 5 is a side perspective view of a portion of the oven broken away and in section, showing the exterior skin, insulation, and interior cooking chamber, with the driver mechanism operating the first hex plate and counterbalance ring.

The driver mechanism 18, as shown in FIGS. 2 and 5, comprises a housing 44. A drive motor 46 has a shaft 48 and is carried within the housing 44. A first gear 50 is attached to the shaft 48 of the drive motor 46. A second gear 52 is attached to an end of the main axle 36 of the shelf assembly 16. A continuous chain 54 extends about the first gear 50 and the second gear 50. A shelf rotation toggle switch 56 is electrically connected to the drive motor 46. The switch 56 is mounted on the main oven body enclosure 12 adjacent the cooking access system 22. When the switch 56 is flipped to its forward/reverse position, electric power will be supplied to the drive motor 46, whose rotational torque is transferred from the shaft 48 and the first gear 50 along the chain 54 to the second gear 52, causing horizontal rotation of the main axle 36.

Figure 4:
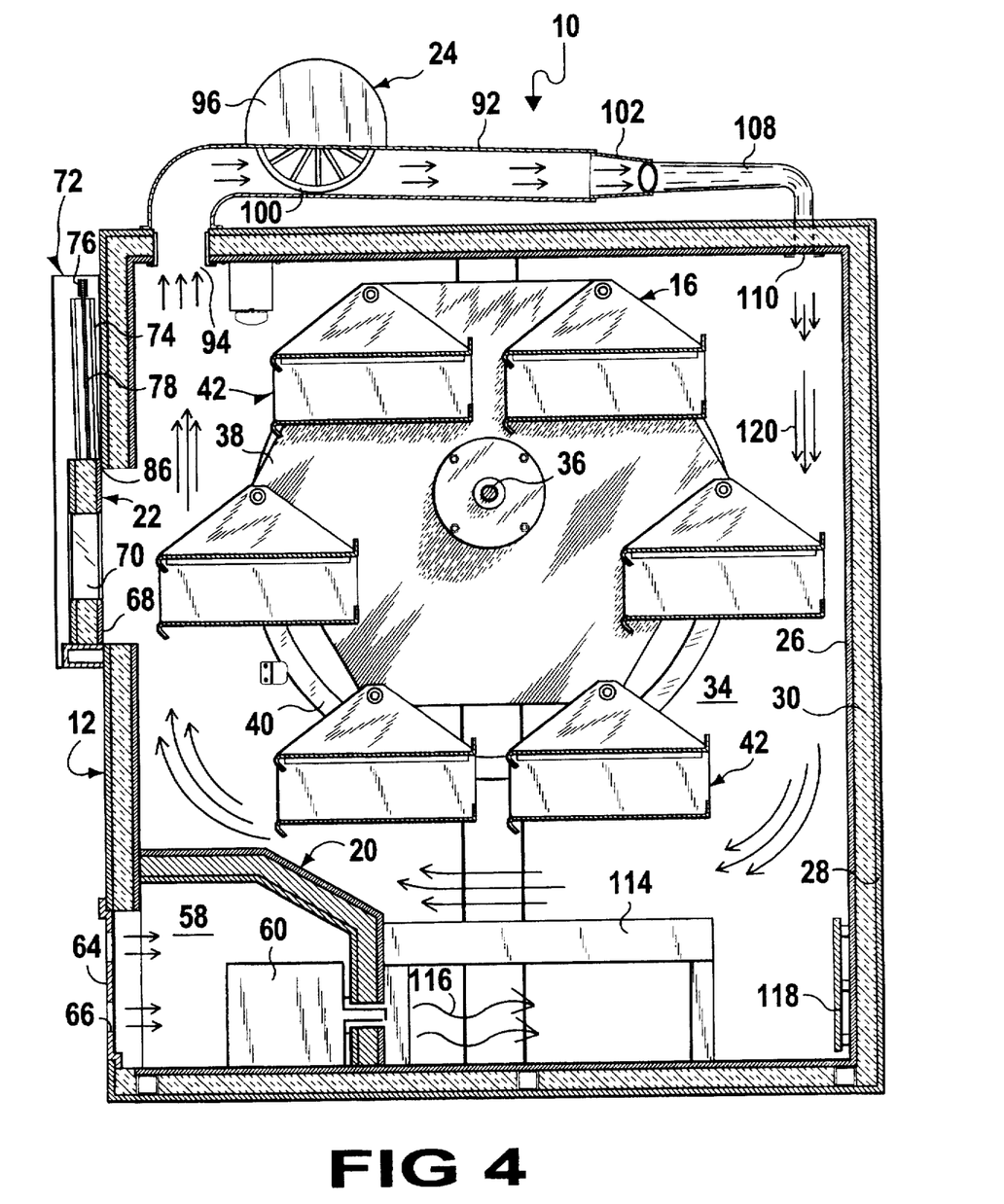
FIG. 4 is a cross sectional view taken along line 4—4 in FIG. 2, showing the forced air movement through the oven and the isolated interior cooking chamber.

The gas burner system 20, as best seen in FIG. 4, includes a gas burner compartment 58 in a lower front portion of the main oven body enclosure 12. A gas burner unit 60 is housed within the gas burner compartment 58. A fuel supply conduit 62 extends through the main oven body enclosure 12 to the gas burner unit 60. A gas burner compartment access panel 64 is mounted on the main oven body enclosure 12 in front of the gas burner compartment 58. The access panel 64 has a plurality of vertically spaced air vents 66, through which ambient air is supplied for the gas burner unit 60.

Figure 6:
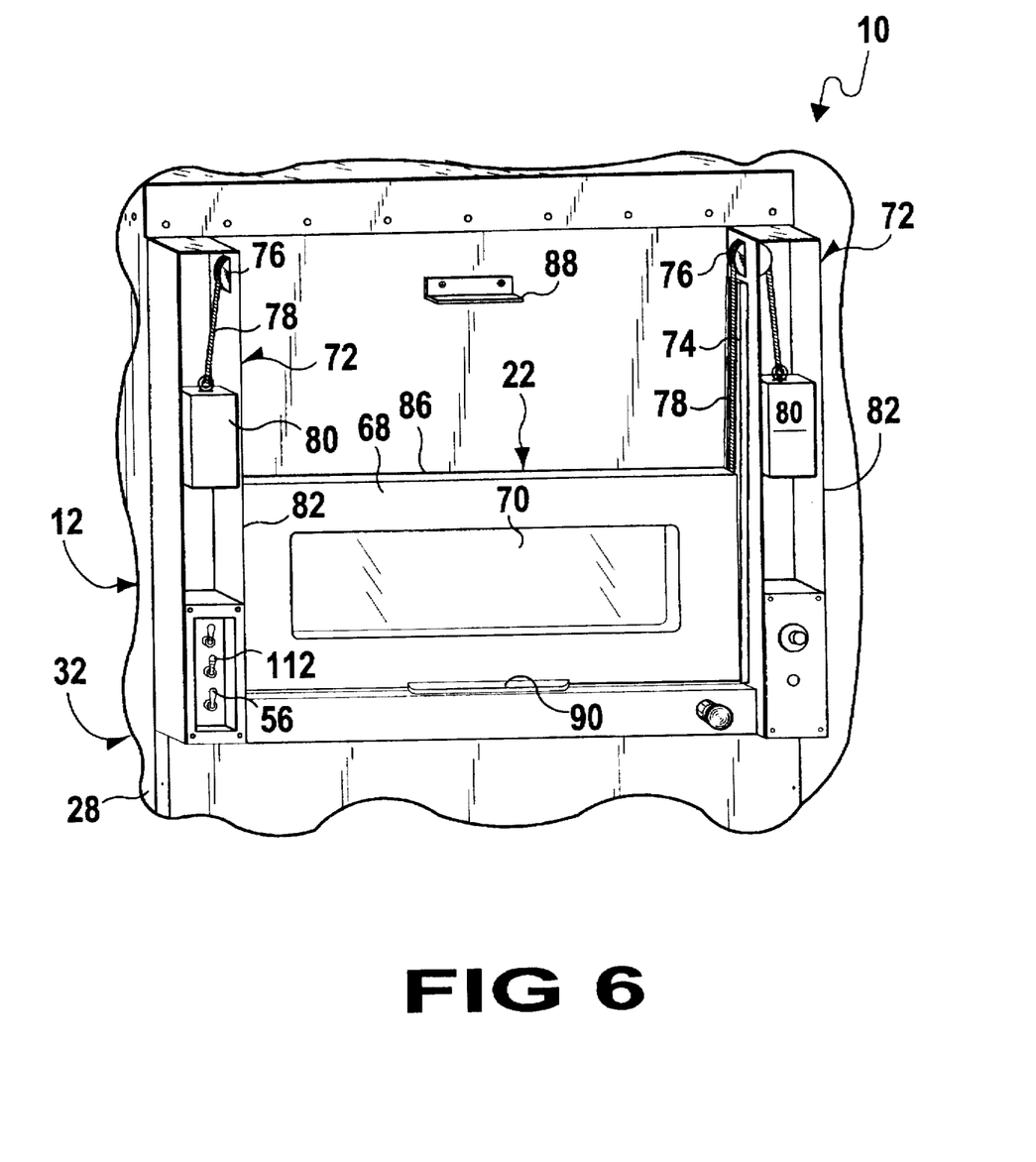
FIG. 6 is a front perspective view of the door, with the access panels to the counterbalance weights removed, showing the position and location of the counterbalance weights, pulleys and wire ropes for the door in the closed position.
Figure 7:
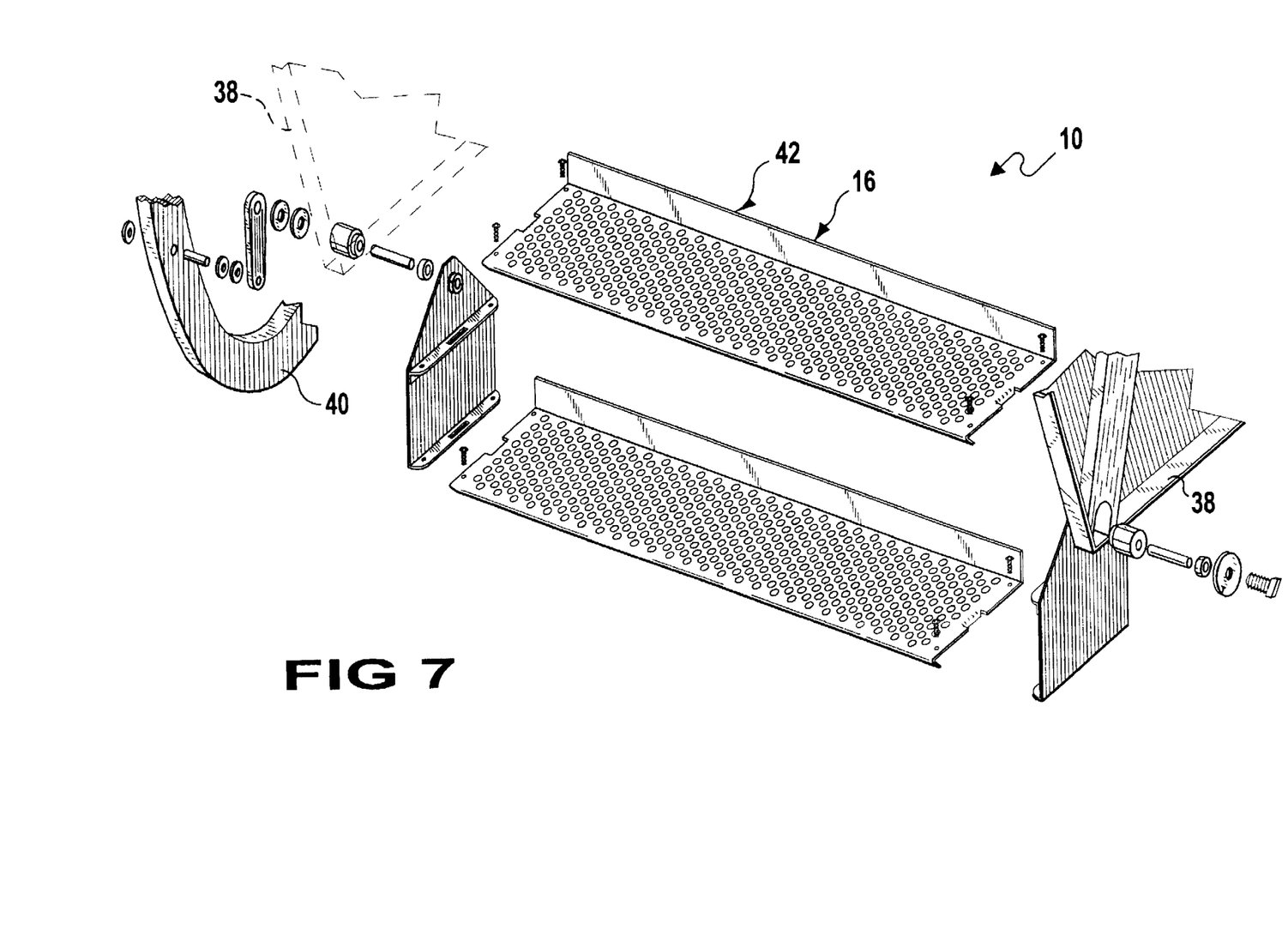
FIG. 7 is an exploded perspective view of a portion of the shelf assembly taken generally in the direction of arrow 7 in FIG. 3.

The cooking access system 22 consists of an insulated door 68 having a window 70 mounted in a front wall of the main oven body enclosure 12, in front of the shelf assembly 16. A pair of door guide members 72 are provided, that are located on each side of the insulated door 68 on the front wall, so as to vertically raise and lower the insulated door 68.

Each door guide member 72 contains a vertical guide track 74, with a pulley 76 mounted at a top end thereof. A wire rope 78 is attached at a first end to one side of the insulated window 68. The wire rope 78 extends up and over the pulley 76. A counterweight 80 is affixed to a second end of the wire rope 80. A counterweight compartment 82 is formed in the door guide member 72, to maintain the counterweight 80 therein. A counterweight compartment access panel 84 covers the counterweight compartment 82.

The vertical guide track 74 is cantilevered at its bottom end towards the interior of the main oven body enclosure 12. The insulated door 68 in its closed position will form a tight thermal seal 86 along a top edge thereof, and an adjacent external surface of the front wall of the main oven body enclosure 12.

The cooking access system 22 further includes a door stop 88 affixed to the front wall of the main oven body enclosure 12. The door stop 88 is spaced away from the top edge of the insulated door 68. A door handle 90 is affixed to the insulated door 68, so as to raise the insulated door 68 to the door stop 88 and break the thermal seal 86.

The forced air circulation system 24 consists of an intake duct 92, having an intake blower port 94 in a top end of the main oven body enclosure 12. A fan housing 96 is on the intake duct 92. A fan motor 98 is on the fan housing 96. A fan 100 is carried in the fan housing 96, which extends into the intake duct 92 and is operable by the fan motor 98. A Y-shaped diverter duct 102 is on a free end of the intake duct 92. A first return duct 104 is connected to the Y-shaped diverter duct 102. The first return duct 104 has a first return duct port 106 in the top end of the main oven body enclosure 12. A second return duct 108 is connected to the Y-shaped diverter duct 102. The second return duct 108 has a second return duct port 110 in the top end of the main oven body enclosure 12.

A blower/burner toggle switch 112 is electrically connected to the fan motor 98. The switch 112 is mounted on the main oven body enclosure 12 adjacent the cooking access system 22. When the switch 112 is flipped to its on position, electric power is supplied to the fan motor 98, rotating the fan 100 which circulates one thousand cubic feet of air between the intake duct 92 and the first and second return ducts 104, 108, causing the food contained on the shelf assembly 16 to be cooked by convection.

As shown in FIG. 4, a flame shield 114 extends horizontally above and directly behind the gas burner compartment 58. The flame shield 114 will protect the food on the shelf assembly 16 from direct exposure to a flame 116 coming out from the gas burner unit 60. A heat shield 118 is installed in a lower rear portion of the main oven body enclosure 12, to absorb heat from the flame 116, when released into the forced air circulation system 24 through an accelerated movement and contact with a heat air current 120, instead of being lost by conduction into the walls of the main oven body enclosure 12 to further enhance fuel savings.

FIG. 4 shows the forced air circulation system 24 in greater detail. The introduction of ambient air to the system occurs through the 400,000 BTU gas burner unit 60. Ambient air will also be introduced into the system, when the insulated door 68 is opened, to insert and extract food. This air is not necessary to the functioning of the forced air circulation system 24, nor will it impact the efficiency of the system. In normal operation, other than the amount of fuel required to maintain the system, becomes a direct variable as to the amount of time the insulated door 68 is in the open position.

The gas burner unit 60, draws in air from the gas burner compartment 58, whose supply is replenished through the vertically spaced air vents 66, located in the gas burner compartment access panel 64. When the flame 116 enters the isolated cooking chamber 34, it will encounter a strong updraft caused by the counterclockwise circulation of the heat air current 120, which is necessary to achieve an even distribution of heat to avoid hot spots.

LIST OF REFERENCE NUMBERS 10 energy efficient high capacity rotary oven
12 main oven body enclosure of 10
14 exhaust pipe on 12
16 shelf assembly of 10
18 driver mechanism of 10
20 gas burner system of 10
22 cooking access system of 10
24 forced air circulation system of 10
26 interior stainless steel panel of 12
28 exterior stainless steel panel of 12
30 KFAC insulation of 12
32 external hull of 12
34 isolated cooking chamber in 12
36 main axle of 16
38 hex shaped plate of 16
40 counterbalance ring of 16
42 two shelf member of 16
44 housing of 18
46 drive motor of 18
48 shaft of 46
50 first gear of 18
52 second gear of 18
54 continuous chain of 18
56 shelf rotation toggle switch of 18
58 gas burner compartment of 20
60 gas burner unit of 20
62 fuel supply conduit of 20
64 gas burner compartment access panel
66 air vent in 64

68 insulated door of 22
70 window in 68
72 door guide member of 22
74 vertical guide track of 72
76 pulley of 72
78 wire rope of 72
80 counterweight of 72
82 counterweight compartment in 72
84 counterweight compartment access panel of 72
86 thermal seal on 68
88 door stop of 22 on 12
90 door handle of 22 on 68
92 intake duct of 24
94 intake blower port of 92
96 fan housing of 24
98 fan motor of 24
100 fan of 24
102 Y-shaped diverter duct of 24
104 first return duct of 24
106 first return duct port of 104
108 second return duct of 24
110 second return duct port of 108
112 blower/burner toggle switch of 24
114 flame shield in 12
116 flame from 60
118 heat shield in 12
120 heat air current in 12

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An energy efficient high capacity rotary oven comprising:
   a) a main oven body enclosure having an exhaust pipe;
   b) a shelf assembly mounted in a rotatable manner within said main oven body enclosure between lateral side walls thereof, whereby said shelf assembly will hold various foods to be cooked;
   c) a driver mechanism mounted on said main oven body enclosure for rotating said shelf assembly;
   d) a gas burner system within said main oven body enclosure below said shelf assembly;
   e) a cooking access system on said main oven body enclosure in front of said shelf assembly, so that a person can open said cooking access system to safely reach the food on said shelf assembly; and
   f) a forced air circulation system on said main oven body enclosure.

2. An energy efficient high capacity rotary oven as recited in claim 1, wherein said main oven body enclosure includes:
   a) a plurality of interior stainless steel panels;
   b) a plurality of exterior stainless steel panels; and
   c) KFAC insulation encased between said interior stainless steel panels and said exterior stainless steel panels, to form an external hull having an isolated cooking chamber therein.

3. An energy efficient high capacity rotary oven as recited in claim 1, wherein said shelf assembly includes:
   a) a main axle horizontally mounted between said lateral side walls of said main oven body enclosure;
   b) a pair of reinforced hex shaped plates, in which each said hex plate is attached centrally near one end of said main axle adjacent one side wall of said main oven body enclosure;
   c) a counterbalance ring affixed to one said hex plate; and
   d) six two shelf members pivotally mounted to said hex plates, so that each said two shelf member will always hang down during rotation thereof and support food to be cooked.

4. An energy efficient high capacity rotary oven as recited in claim 3, wherein said driver mechanism includes:
   a) a housing;
   b) a drive motor having a shaft and carried within said housing;
   c) a first gear attached to said shaft of said drive motor;
   d) a second gear attached to an end of said main axle of said shelf assembly;
   e) a continuous chain extending about said first gear and said second gear; and
   f) a shelf rotation toggle switch electrically connected to said drive motor, said switch mounted on said main oven body enclosure adjacent said cooking access system, so that when said switch is flipped to its forward/reverse position, electric power will be supplied to said drive motor, whose rotational torque is transferred from said shaft and said first gear along said chain to said second gear, causing horizontal rotation of said main axle.

5. An energy efficient high capacity rotary oven as recited in claim 1, wherein said gas burner system includes:
   a) a gas burner compartment in a lower front portion of said main oven body enclosure;
   b) a gas burner unit housed within said gas burner compartment;
   c) a fuel supply conduit extending through said main oven body enclosure to said gas burner unit; and
   d) a gas burner compartment access panel mounted on said main oven body enclosure in front of said gas burner compartment, said access panel having a plurality of vertically spaced air vents, through which ambient air is supplied for said gas burner unit.

6. An energy efficient high capacity rotary oven as recited in claim 1, wherein said cooking access system includes:
   a) an insulated door having a window mounted in a front wall of said main oven body enclosure in front of said shelf assembly; and
   b) a pair of door guide members that are located on each side of said insulated door on said front wall, so as to vertically raise and lower said insulated door.

7. An energy efficient high capacity rotary oven as recited in claim 6, wherein each said door guide member includes:
   a) a vertical guide track;
   b) a pulley mounted at a top end thereof;

c) a wire rope attached at a first end to one side of said insulated window, whereby said wire rope extends up and over said pulley;

d) a counterweight affixed to a second end of said wire rope;

e) a counterweight compartment formed in said door guide member to maintain said counterweight therein; and f) a counterweight compartment access panel to cover said counterweight compartment.

8. An energy efficient high capacity rotary oven as recited in claim 7, wherein said vertical guide track is cantilevered at its bottom end towards the interior of said main oven body enclosure, so that said insulated door in its closed position will form a tight thermal seal along a top edge thereof and an adjacent external surface of said front wall of said main oven body enclosure.

9. An energy efficient high capacity rotary oven as recited in claim 8, wherein said cooking access system further includes:

a) a door stop affixed to said front wall of said main oven body enclosure, whereby said door stop is spaced away from said top edge of said insulated door; and b) a door handle affixed to said insulated door, so as to raise said insulated door to said door stop and break said thermal seal.

10. An energy efficient high capacity rotary oven as recited in claim 1, wherein said forced air circulation system includes:

a) an intake duct having an intake blower port in a top end of said main oven body enclosure;

b) a fan housing on said intake duct;

c) a fan motor on said fan housing;

d) a fan carried in said fan housing which extends into said intake duct and operable by said fan motor;

e) a Y-shaped diverter duct on a free end of said intake duct;

f) a first return duct connected to said Y-shaped diverter duct, said first return duct having a first return duct port in said top end of said main oven body enclosure;

g) a second return duct connected to said Y-shaped diverter duct, said second return duct having a second return duct port in said top end of said main oven body enclosure; and h) a blower/burner toggle switch electrically connected to said fan motor, said switch mounted on said main oven body enclosure adjacent said cooking access system, so that when said switch is flipped to its on position, electric power is supplied to said fan motor, rotating said fan which circulates one thousand cubic feet of air between said intake duct and said first and second return ducts, causing the food contained on said shelf assembly to be cooked by convection.

11. An energy efficient high capacity rotary oven as recited in claim 5, further including:

a) a flame shield extending horizontally above and directly behind said gas burner compartment, so that said flame shield will protect the food on said shelf assembly from direct exposure to a flame coming out from said gas burner unit; and b) a heat shield installed in a lower rear portion of said main oven body enclosure, to absorb heat from said flame when released into said forced air circulation system through an accelerated movement and contact with a heat air current, instead of being lost by conduction into the walls of said main oven body enclosure to further enhance fuel savings.

12. An energy efficient high capacity rotary oven comprising:

a) a main oven body enclosure having an exhaust pipe, wherein said main oven body enclosure includes a plurality of interior stainless steel panels, a plurality of exterior stainless steel panels and KFAC insulation encased between said interior stainless steel panels and said exterior stainless steel panels, to form an external hull having an isolated cooking chamber therein;

b) a shelf assembly mounted in a rotatable manner within said main oven body enclosure between lateral side walls thereof, whereby said shelf assembly will hold various foods to be cooked;

c) a driver mechanism mounted on said main oven body enclosure for rotating said shelf assembly;

d) a gas burner system within said main oven body enclosure below said shelf assembly;

e) a cooking access system on said main oven body enclosure in front of said shelf assembly, so that a person can open said cooking access system to safely reach the food on said shelf assembly; and f) a forced air circulation system on said main oven body enclosure.

13. An energy efficient high capacity rotary oven as recited in claim 12, wherein said shelf assembly includes:

a) a main axle horizontally mounted between said lateral side walls of said main oven body enclosure;

b) a pair of reinforced hex shaped plates, in which each said hex plate is attached centrally near one end of said main axle adjacent one side wall of said main oven body enclosure;

c) a counterbalance ring affixed to one said hex plate; and d) six two shelf members pivotally mounted to said hex plates, so that each said two shelf member will always hang down during rotation thereof and support food to be cooked.

14. An energy efficient high capacity rotary oven as recited in claim 13, wherein said driver mechanism includes:

a) a housing;

b) a drive motor having a shaft and carried within said housing;

c) a first gear attached to said shaft of said drive motor;

d) a second gear attached to an end of said main axle of said shelf assembly;

e) a continuous chain extending about said first gear and said second gear; and f) a shelf rotation toggle switch electrically connected to said drive motor, said switch mounted on said main oven body enclosure adjacent said cooking access system, so that when said switch is flipped to its forward/reverse position, electric power will be supplied to said drive motor, whose rotational torque is transferred from said shaft and said first gear along said chain to said second gear, causing horizontal rotation of said main axle.

15. An energy efficient high capacity rotary oven as recited in claim 14, wherein said gas burner system includes:

a) a gas burner compartment in a lower front portion of said main oven body enclosure;

b) a gas burner unit housed within said gas burner compartment;

c) a fuel supply conduit extending through said main oven body enclosure to said gas burner unit; and d) a gas burner compartment access panel mounted on said main oven body enclosure in front of said gas burner compartment, said access panel having a plurality of vertically spaced air vents, through which ambient air is supplied for said gas burner unit.

16. An energy efficient high capacity rotary oven as recited in claim 15, wherein said cooking access system includes:

a) an insulated door having a window mounted in a front wall of said main oven body enclosure in front of said shelf assembly; and b) a pair of door guide members that are located on each side of said insulated door on said front wall, so as to vertically raise and lower said insulated door.

17. An energy efficient high capacity rotary oven as recited in claim 16, wherein each said door guide member includes:

a) a vertical guide track;

b) a pulley mounted at a top end thereof;

c) a wire rope attached at a first end to one side of said insulated window, whereby said wire rope extends up and over said pulley;

d) a counterweight affixed to a second end of said wire rope;

e) a counterweight compartment formed in said door guide member to maintain said counterweight therein; and f) a counterweight compartment access panel to cover said counterweight compartment.

18. An energy efficient high capacity rotary oven as recited in claim 17, wherein said vertical guide track is cantilevered at its bottom end towards the interior of said main oven body enclosure, so that said insulated door in its closed position will form a tight thermal seal along a top edge thereof and an adjacent external surface of said front wall of said main oven body enclosure.

19. An energy efficient high capacity rotary oven as recited in claim 18, wherein said cooking access system further includes:

a) a door stop affixed to said front wall of said main oven body enclosure, whereby said door stop is spaced away from said top edge of said insulated door; and b) a door handle affixed to said insulated door, so as to raise said insulated door to said door stop and break said thermal seal.

20. An energy efficient high capacity rotary oven as recited in claim 19, wherein said forced air circulation system includes:

a) an intake duct having an intake blower port in a top end of said main oven body enclosure;

b) a fan housing on said intake duct;

c) a fan motor on said fan housing;

d) a fan carried in said fan housing which extends into said intake duct and operable by said fan motor;

e) a Y-shaped diverter duct on a free end of said intake duct;

f) a first return duct connected to said Y-shaped diverter duct, said first return duct having a first return duct port in said top end of said main oven body enclosure;

g) a second return duct connected to said Y-shaped diverter duct, said second return duct having a second return duct port in said top end of said main oven body enclosure; and h) a blower/burner toggle switch electrically connected to said fan motor, said switch mounted on said main oven body enclosure adjacent said cooking access system, so that when said switch is flipped to its on position, electric power is supplied to said fan motor, rotating said fan which circulates one thousand cubic feet of air between said intake duct and said first and second return ducts, causing the food contained on said shelf assembly to be cooked by convection.

21. An energy efficient high capacity rotary oven as recited in claim 20, further including:

a) a flame shield extending horizontally above and directly behind said gas burner compartment, so that said flame shield will protect the food on said shelf assembly from direct exposure to a flame coming out from said gas burner unit; and b) a heat shield installed in a lower rear portion of said main oven body enclosure, to absorb heat from said flame when released into said forced air circulation system through an accelerated movement and contact with a heat air current, instead of being lost by conduction into the walls of said main oven body enclosure to further enhance fuel savings.

* * * * *